United States Patent

Sato et al.

[11] Patent Number: 5,531,291
[45] Date of Patent: Jul. 2, 1996

[54] POWER PLANT FOR AUTOMOBILE

[75] Inventors: Motoharu Sato, Hiroshima-ken; Masaya Watanabe, Yokohama, both of Japan

[73] Assignee: Mazda Motor Corporation, Hiroshima-ken, Japan

[21] Appl. No.: 135,181

[22] Filed: Jul. 21, 1993

[30] Foreign Application Priority Data

Jul. 24, 1992 [JP] Japan ................................ 4-218253

[51] Int. Cl.⁶ .................................................. B10K 5/04
[52] U.S. Cl. ..................................................... 180/297
[58] Field of Search .................................. 180/297, 374, 180/376, 248, 291

[56] References Cited

U.S. PATENT DOCUMENTS

| 4,901,814 | 2/1990 | von Broock et al. | 180/297 |
| 5,129,476 | 7/1992 | Kikuchi et al. | 180/297 |
| 5,195,607 | 3/1993 | Shimada et al. | 180/297 |
| 5,230,401 | 7/1993 | Kameda et al. | 180/297 |
| 5,305,848 | 4/1994 | Akutagawa et al. | 180/297 |
| 5,309,789 | 5/1994 | Kameda et al. | 180/297 |

FOREIGN PATENT DOCUMENTS

| 1-316561 | 12/1989 | Japan . | |
| 0301410 | 12/1989 | Japan | 180/297 |
| 0399502 | 11/1990 | Japan | 180/297 |
| 0082631 | 4/1991 | Japan | 180/297 |

*Primary Examiner*—Richard M. Camby
*Attorney, Agent, or Firm*—Keck, Mahin & Cate

[57] ABSTRACT

An automobile power plant includes an engine with a crankshaft mounted transversely in an engine compartment, a differential disposed behind the engine, and a transmission which is transversely mounted between and below the engine and differential so as to place its input, primary output and counter output shafts in parallel with the crankshaft.

8 Claims, 4 Drawing Sheets

POWER PLANT FOR AUTOMOBILE

BACKGROUND OF THE INVENTION

1. Field of the Invention

This invention relates to an automobile power plant and, in particular, relates to a power plant in which a transmission is transversely mounted immediately behind a transversely mounted engine with an engine crankshaft and a transmission output shaft lying parallel to each other.

2. Description of Related Art

In a conventional automobile power plant layout, as depicted in FIG. 1, an engine 91 and a transmission 92 are mounted in line in a lengthwise direction of a car so that input and output shafts of the transmission are aligned in a straight line with an output shaft, such as a crankshaft, of the engine. However, such a power plant layout does not lend itself well for adaptation to the construction of compact power plants and low hood lines.

Japanese Unexamined Patent Publication No. 1-316561, an embodiment of which is depicted in FIG. 2, reveals a conventional solution for providing compact power plants in which engine 93 is transversely mounted within the engine compartment accompanied by transmission 94 also being transversely mounted immediately behind it so as to place the transmission output shaft in parallel with the output shaft of engine 93. A power transfer means 95 is attached to one end of the engine output shaft, and extends toward the rear to a point at which it is connected to the laterally extending input shaft of the transmission to facilitate the transfer of power from the output shaft of engine 93 to the input shaft of transmission 94. Further, a two-wheel drive differential 97 is located toward the rear of transmission case 96, and front wheel drive axles 98 and 99 are connected to its right and left sides.

The conventional type of power plant depicted in FIG. 2 is more compact than power plants which utilize the in line lengthwise arrangement shown in FIG. 1, and is particularly advantageous for use with vehicles having low hood lines. With this power plant, differential 97 is positioned to the rear of the crankshaft of engine 93 and the transmission 94 is displaced above and between the crankshaft of engine 93 and drive axles of the differential 97. In this arrangement, if a measurable improvement is achieved by shortening the front overhang of a vehicle by tilting the engine 93 toward the rear of the vehicle, then the space between the rear surface of engine 93 and a dash panel becomes constricted and is narrowed, thereby limiting the freedom of layout available for the placement of the transmission 94 and the differential 97. This is a problem particularly evident with V-type engines.

SUMMARY OF THE INVENTION

It is a primary object of the present invention to provide an automobile power plant in which a differential is centered to the rear of the center of a crankshaft of an engine and a transmission is disposed so as to make efficient use of the space located between and below the centers of the crankshaft and differential so that the engine is enabled to be tilted toward the rear of the vehicle for a reduction in the overhang of the vehicle. A layout in which auxiliary equipments of the engine is thereby provided can be more efficiently situated in front of the engine.

It is another object of the present invention to provide an automobile power plant in which a significant improvement in space utilization is achieved by locating a transmission so as to place its larger diameter primary output shaft below its smaller diameter counter output shaft, thereby enabling the transmission to be located neatly in a small space formed behind the engine.

The foregoing objects of the present invention are achieved by providing an automobile power plant including a engine transversely mounted in an engine compartment. The power train further includes a differential, such as a front differential, disposed behind the engine and a transmission disposed behind the engine with its primary or main output shaft, such as a transmission output shaft, placed in parallel with the engine crankshaft and between and below the engine and the differential.

Specifically, the transmission is mounted so as to place its primary output shaft lower than its secondary or counter output shaft with respect to the crankshaft.

According to the power plant of the present invention, the front differential is positioned so as to place the center axis of the drive shaft to the rear of the center axis of the crankshaft. The transmission is located between and below the engine and the differential. This layout of the transmission makes efficient use of a space provided below and between the crankshaft and front differential and, in addition, enables tilting of the V-type engine towards the rear of the vehicle. Tilting of the V-type engine backward shortens the front overhang of the vehicle body so as to enable the creation of a shorter nose vehicle body and, in addition, creates a space in the front of the V-type engine in which the engine related auxiliary components, such as an air compressor, a power steering pump, and a catalytic converter, are efficiently displaced. Furthermore, since the transmission is located with its primary output shaft, which is relatively large in diameter, below its counter output shaft, which is smaller in diameter than the primary output shaft, it fits neatly into the small space formed below the overhang created by the rearward tilting rear cylinder bank of the V-type engine with an improved space utilization efficiency in comparison with conventional arrangements of power plants.

BRIEF DESCRIPTION OF THE DRAWINGS

The above and other objects and features of the present invention will be clearly understood from the following description which is directed to a preferred embodiment thereof when considering in conjunction with the appended drawings, in which.

DETAILED DESCRIPTION OF THE PREFERRED EMBODIMENT

Figure 1:
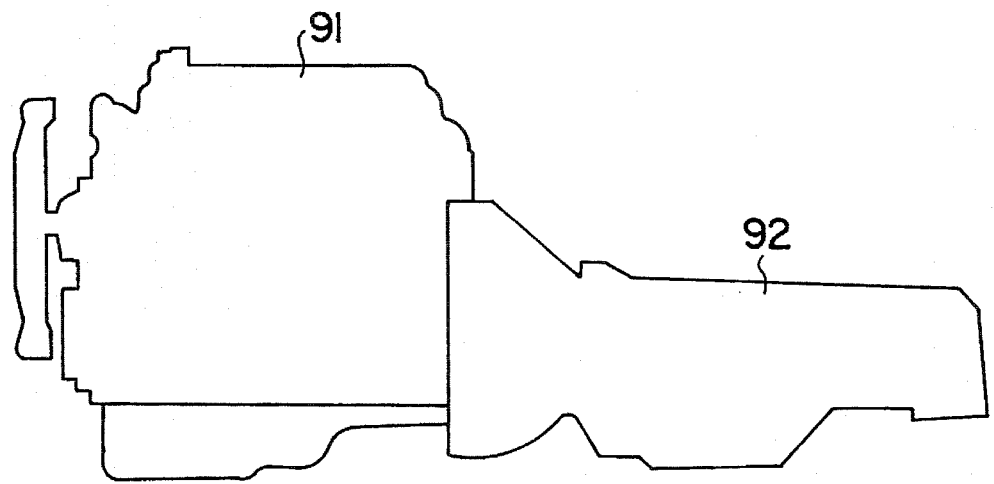
FIG. 1 is a schematic illustration of an in-line lengthwise arrangement of a conventional automobile power plant.
Figure 2:
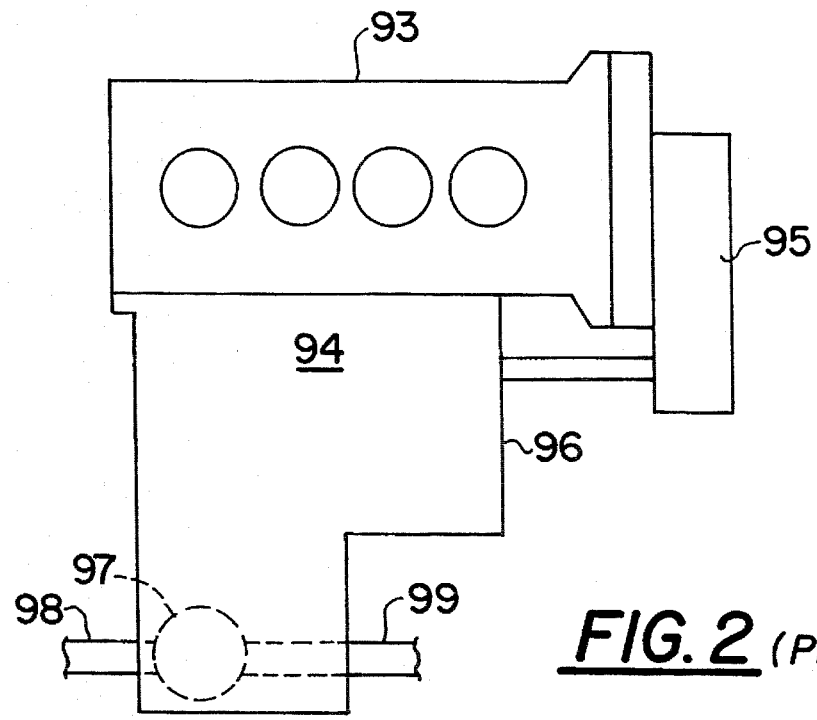
FIG. 2 is a schematic illustration of a transverse arrangement of a conventional automobile power plant.
Figure 3:
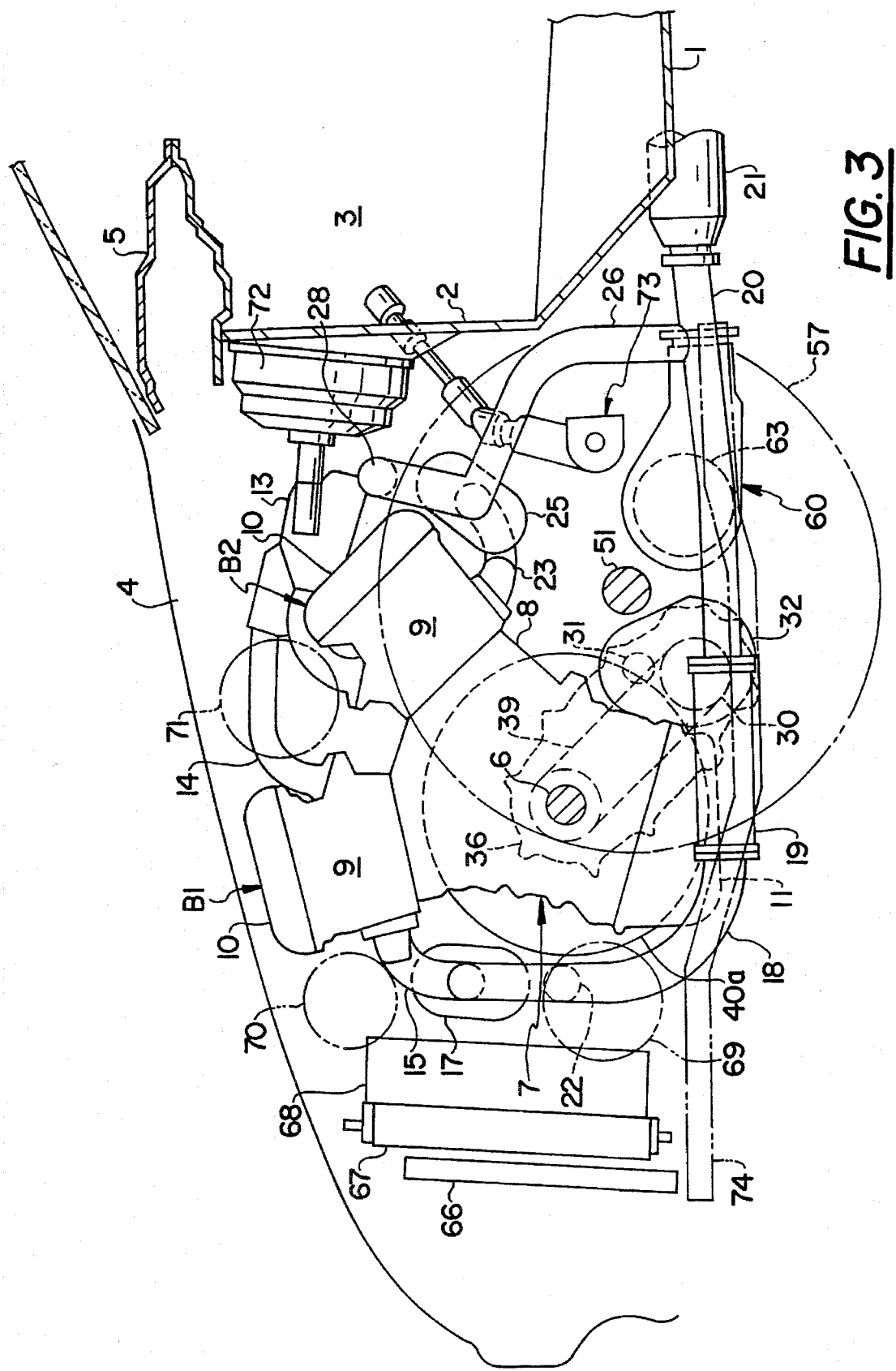
FIG. 3 is an elevational side view of an automobile power plant in accordance with a preferred embodiment of the present invention.
Figure 4:
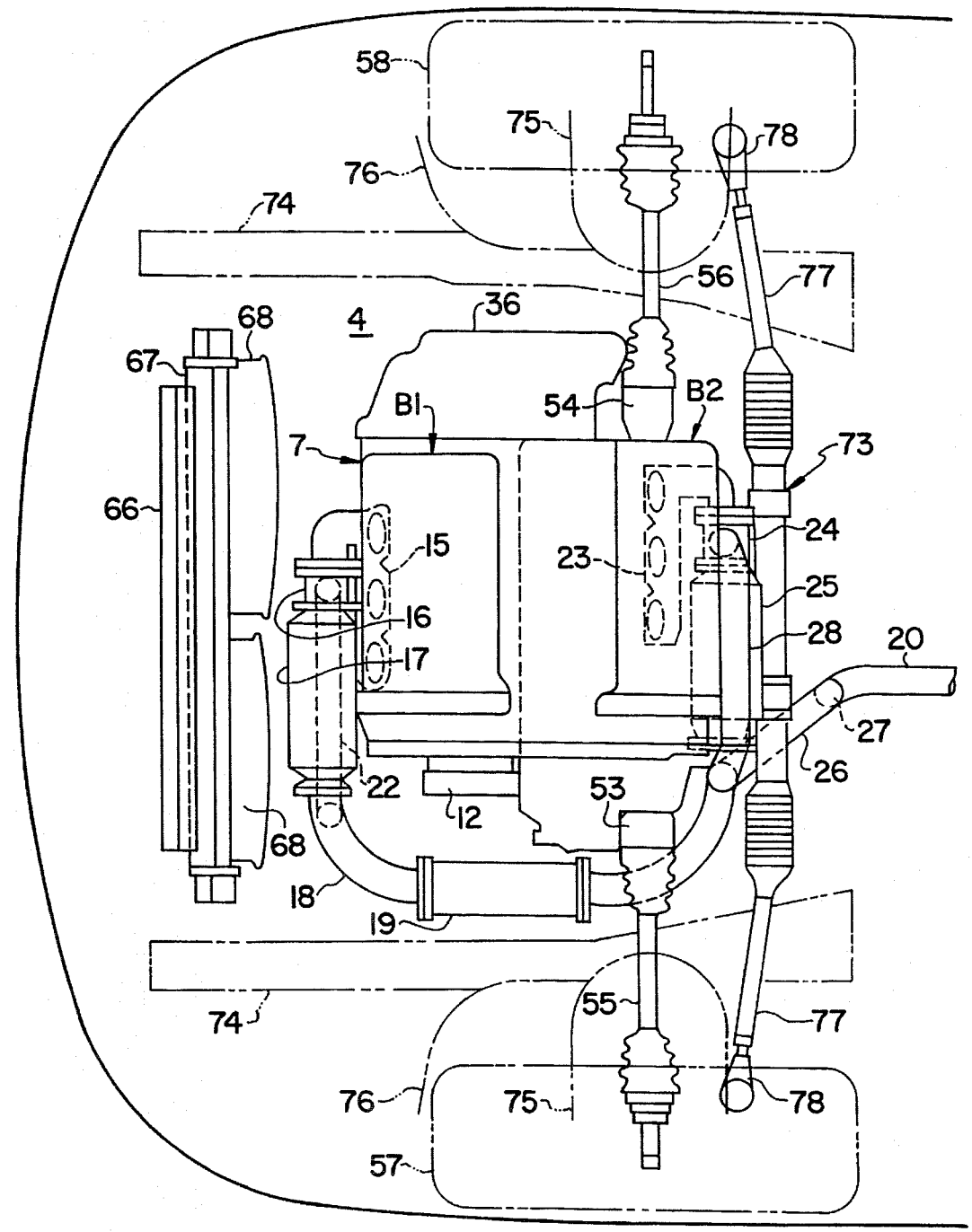
FIG. 4 is a plan view of the automobile power plant of FIG. 3.

Referring to the drawings in detail and, in particular, to FIGS. 3 and 4 showing a power plant in accordance with a preferred embodiment of the present invention, a lower dashpanel 2 is integrally formed with and extends upward from a front end of a floor panel 1 so as to separate an engine compartment from a passenger compartment 3. A cowl box 5, extending transversely across the width of the vehicle, is formed at the top of the lower dashpanel 2. V-type six cylinder engine 7, having front and rear cylinder banks B1 and B2 arranged to form a V-space therebetween, is transversely mounted in the engine compartment 4 with its output shaft, such as a crankshaft 6, transversely placed. This V-type six cylinder engine 7 is tilted toward the rear of the vehicle. The engine 7 is comprised of a cylinder block 8, a cylinder head 9 for each of the cylinder banks B1 and B2, respectively, and a cylinder head cover 10 for each cylinder head 9. Cylinder block 8 is provided with an oil pan 11 attached to its undersurface. A crank pulley 12 is attached to one end, for instance the left end, of the crankshaft 6. Various engine related elements disposed in the engine compartment 4 are a cooler condenser 66, a radiator 67, a cooling fan 68, an air conditioning compressor 69, a power steering pump 70, an alternator 71, a brake booster 72, a rack and pinion steering mechanism 73, and a front frame 74.

Referring to FIG. 3, engine 7 is provided with an intake manifold 14 with an unitized surge tank 13. This manifold 14 is equipped with an air intake passage (not shown) which communicates with air intake ports of each of the cylinder banks B1 and B2. The engine 7 is further provided with an exhaust manifold 15, connected to the front cylinder bank B1, which communicates with exhaust ports. This exhaust manifold 15 is provided with a changeover valve 16, an upstream catalytic converter 17, which is relatively low in heat resistance and is used to reduce nitrogen oxide (NOx) emissions during, in particular, lean-fuel burning, a front exhaust pipe 18, a three-way catalytic converter 19, a mid-exhaust pipe 20, and a downstream three-way catalytic converter 21, in order from an engine side of the arrangements. A bypass pipe 22 is connected between the changeover valve 16 and the downstream portion of catalytic converter 17 in order to allow exhaust gas to bypass the upstream catalytic converter 17 when engine 7 operates under high loads and high speeds so as to prevent heat related deterioration of the upstream catalytic converter 17.

Similarly, an exhaust manifold 23 is connected to the rear cylinder bank B2 so as to communicate with exhaust ports. The exhaust manifold 23 is provided with a changeover valve 24, an upstream catalytic converter 25, and a front exhaust pipe 26, in order from the engine side. This front exhaust pipe 26 is connected at its downstream end to an exhaust gas accumulator 27. A bypass pipe 28 is connected between the changeover valve 24 and the downstream portion of catalytic converter 25 in order to allow exhaust gas to bypass the upstream catalytic converter 25 when engine 7 operates under high loads and high speeds. This serves to prevent heat related deterioration of catalytic converter 25, which is used to reduce nitrogen oxide (NOx) and has a low heat resistance. As seen in FIG. 4, there are disposed various elements related to front wheels 57 and 58, such as suspension towers 75, wheel housings 76, tie rods 77, and knuckle arms 78.

Figure 5:
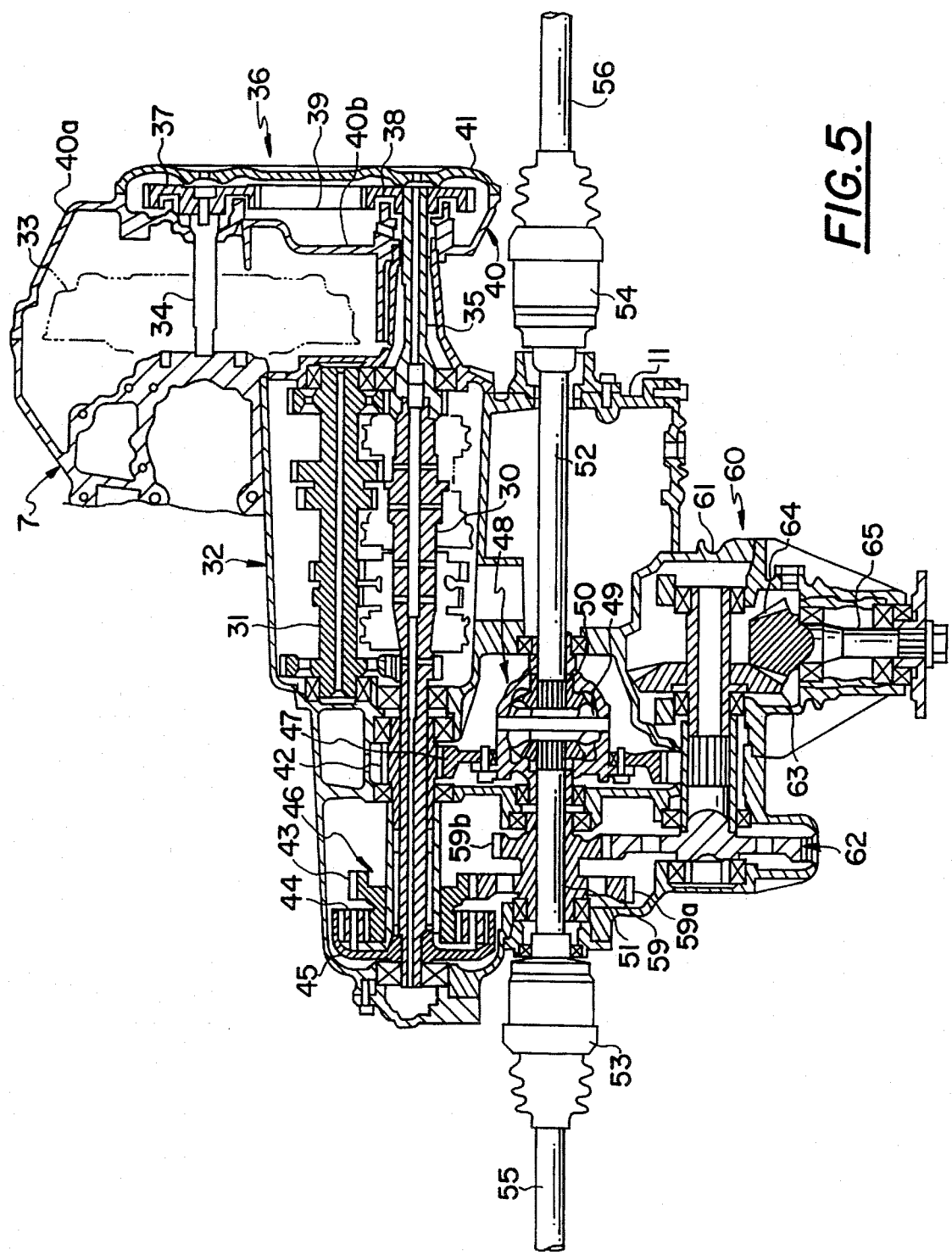
FIG. 5 is a developmental view of the automobile power plant of FIG. 3, as viewed from the top.

Referring to FIG. 5, a manual transmission 32 is transversely disposed behind and structurally united with V-type engine 7 so as to place a primary or main output shaft 30, which serves as an output shaft, and a secondary or counter output shaft 31 in parallel with engine crankshaft 6. The novel power plant is equipped with a power transmission means 36 to transmit power from the crankshaft 6 to the transmission input shaft 35 through an output shaft 34 of a clutch 33. This power transmission means 36 has a drive sprocket 37, fixedly attached to output shaft 34, and a driven sprocket 38, fixedly attached to transmission input shaft 35, which are operationally coupled by a chain 39. These elements 37, 38 and 39 of transmission means 36 are surrounded and covered by fabricated member 40 (40a and 40b) and chain cover 41. The fabricated member 40, which in turn connects the V-type engine 7 and the transmission 32, serves to define a clutch housing by 40a and a chain cover by 40b.

To an extension of primary output shaft 30, on one side of the transmission 32 remote from transmission means 36, is fixedly attached an output gear 42. Further, on an outer end portion of the extension of primary output shaft 30 is mounted a center differential 46 comprised by a sun gear 43, a planetary gear 44 and a ring gear 45. Specifically, the center differential 46 is mounted on the primary output shaft 30 through the ring gear 45 fixedly attached to the outer end of the primary output shaft 30. The center differential 46, comprising a planetary gear mechanism, transfers power from the primary output shaft 30 of transmission 32 to rear wheels (not shown) and simultaneously allows the front and rear wheels to turn at different speeds.

The novel power plant is equipped with a front differential 48 in which its ring gear 47 is kept engaged with the output gear 42 of transmission 32. The front differential 48, which in turn comprises pinion gears 49 and side gears 50, is linked to the front wheels in such a way to locate the ring gear 47 on the side of center differential 46, or remote from the transmission means 36, securing the side gears 50 to left and right drive shafts 51 and 52, respectively. These drive shafts 51 and 52 are connected to left and right front wheels 57 and 58 through uniform-speed ball joints 53 and 54, and front axles 55 and 56, respectively. Gear means 59, which is provided with an input gear 59a and output gear 59b, is mounted on drive shaft 51 between the uniform-speed ball joint 53 and side gear 50 so as to transmit drive torque to a transfer 60 located behind the gear means 59 through output gear 59a.

Transfer 60, located behind, or to the rear of, front differential 48, is comprised by an input gear 62, a transfer ring gear 63 located coaxially with input gear 62, a pinion gear 64 kept engaged with transfer ring gear 63, and a drive pinion shaft 65 formed integrally with pinion gear 64, all of which are housed within a transfer casing 61. The input gear 62 transmits drive torque from the output gear 59b of gear means 59 to the transfer 60 therethrough. The drive pinion shaft 65 drives the rear wheels via a propeller shaft, not shown.

In this operation of the power plant thus structured and arranged as described above, power transmission from engine 7 to transmission 32 is made through, in order from the engine end, clutch 33, clutch output shaft 34, drive sprocket 37, chain 39, driven sprocket 38 and transmission input shaft 35. In addition, power transmission from primary output shaft 30 of the transmission 32 to front wheels 57 and 58 is made through, in order from the transmission input side, primary output shaft 30, output gear 42, ring gear 47, front differential 48, drive shafts 51 and 52, ball joints 53 and 54, and front axles 55 and 56.

Furthermore, the course of power transmission to the rear wheels from the primary output shaft 30 of the transmission 32 is formed through, in order from the transmission side, center differential 46, sun gear 43, input and output gears 59a and 59b, input gear 62, ring gear 63, pinion gear 64, and drive pinion shaft 65.

With the power plant, as clearly understood from FIGS. 3–5 and the above description, the front differential 48 is positioned so as to place its center (differential center), i.e. the center axis of drive shaft 51, to the rear of the crank center, which is also referred to as the center axis of crankshaft 6 the of V-type engine 7. The transmission 32 is displaced to make efficient use of a space provided below and between the centers of crankshaft 6 and front differential 48 and, in addition, within the transmission 32, the primary output shaft 30 is positioned lower than counter output shaft 31 with respect to the ground. This arrangement of transmission 32 enables tilting of the V-type engine 7 towards the rear of the vehicle. Tilting of V-type engine 7 clockwise about its axis, as seen in FIG. 3, toward the back shortens the front overhang of the vehicle body, enables the creation of a shorter nose vehicle body and, in addition, creates a space in front of the V-type engine in which the engine related auxiliary components (e.g. air compressor 69, power steering pump 70, and catalytic converter 17) are efficiently displaced, positioned or located. Furthermore, since the transmission 32 is located so as to place its larger diameter primary output shaft 30 below its smaller diameter counter output shaft 31, it fits neatly into the small space formed below the overhang created by the rearward tilted rear cylinder bank of the V-type engine 7. An improved space utilization efficiency in comparison with conventional arrangements of power plants is provided.

Although the present invention has been described with respect to a preferred embodiment thereof, various other embodiments and variants which do not depart from the scope and spirit of the invention may be possible. For instance, the transmission may be not only manual but also automatic. Such other embodiments and variants are deemed to fall within and are intended to be covered by the following claims.

What is claimed is:

1. In a power plant for transmitting engine torque to drive shafts for drive wheels, the improvement comprising:

an engine with a crankshaft, mounted so as to orient an axis of the crankshaft transversely in an engine compartment, for providing torque;

a differential, disposed behind the engine, for driving the drive shafts differentially about axes parallel to said axis of the crankshaft; and a transmission, including an input shaft, a primary output shaft and a counter output shaft, for multiplying engine torque and transmitting it to the differential, said transmission being mounted so that (1) the primary output shaft and the counter output shaft thereof extend along axes disposed transversely between the axis of the crankshaft and the axes parallel to said axis of the crankshaft and (2) the axis along which the primary output shaft extends is disposed below said axis of the crankshaft and the axes parallel to the axis of the crankshaft so as to place said input shaft, said primary output shaft and said counter output shaft of the transmission in parallel with the axis of the crankshaft.

2. An improvement as defined in claim 1, wherein the primary output shaft is located lower than the counter output shaft and both the primary output shaft and the counter output shaft are disposed below the crankshaft.

3. In a power plant for transmitting engine torque to drive shafts for drive wheels, the improvement comprising:

an engine with a crankshaft, mounted so as to orient an axis of the crankshaft transversely in an engine compartment, for providing torque;

a differential, disposed behind the engine, for driving the drive shafts differentially about axes parallel to said axis of the crankshaft; and a transmission for multiplying engine torque and transmitting it to the differential, said transmission being mounted so that a primary output shaft thereof extends along an axis disposed transversely between the axis of the crankshaft and the axes parallel to said axis of the crankshaft and below said axis of the crankshaft and the axes parallel to the axis of the crankshaft so as to place an input shaft, the primary output shaft and a counter output shaft of the transmission in parallel with the axis of the crankshaft;

wherein the input and primary output shafts are coaxially aligned in a straight line.

4. An improvement as defined in claim 1, wherein the engine is a V-type engine tilted backward.

5. An improvement as defined in claim 1, and further comprising transmission means, disposed between the crankshaft and the input shaft of the transmission, for transmitting engine torque to the transmission.

6. An improvement as defined in claim 5, wherein the differential is disposed on one side, remote from the transmission means, with respect to a center line of the vehicle.

7. An improvement as defined in claim 1, wherein the transmission is of a manual type.

8. An improvement as defined in claim 1, wherein the transmission is of an automatic type.

\* \* \* \* \*